(12) United States Patent
Liu et al.

(10) Patent No.: US 11,616,420 B2
(45) Date of Patent: Mar. 28, 2023

(54) FREE PISTON GENERATOR BASED ON SPLIT THERMODYNAMIC CYCLE

(71) Applicant: Harbin Engineering University, Harbin (CN)

(72) Inventors: Long Liu, Harbin (CN); Yuanheng Tang, Harbin (CN); Chen An, Harbin (CN); Xiao Han, Harbin (CN); Junjie Liu, Harbin (CN); Qihao Mei, Harbin (CN); Hao Zhao, Harbin (CN); Zhichun Xu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/564,624

(22) Filed: Dec. 29, 2021

(65) Prior Publication Data
US 2022/0123626 A1    Apr. 21, 2022

(30) Foreign Application Priority Data

Mar. 12, 2021 (CN) .......................... 202110272180.9

(51) Int. Cl.
*H02K 7/18* (2006.01)

(52) U.S. Cl.
CPC ................................ *H02K 7/1815* (2013.01)

(58) Field of Classification Search
CPC ............................. H02K 7/1815; H02K 11/25
See application file for complete search history.

*Primary Examiner* — Sean Gugger
(74) *Attorney, Agent, or Firm* — IPro, PLLC

(57) ABSTRACT

Provided is a free piston generator based on a split thermodynamic cycle, which belongs to the technical field of power energy. The present disclosure solves the problem of low power generation efficiency of an existing free piston generator. The free piston generator includes a linear generator set and two internal combustion engine sets arranged at two ends of the linear generator set. Air is first subjected to first-stage compression by the low-pressure cylinder set in the internal combustion engine sets and is then subjected to second-stage compression in the high-pressure cylinders, so that the intake pressure of an internal combustion engine is effectively increased, which is favorable for increasing the average effective pressure in a work process, thereby improving the thermal efficiency and the power generation efficiency of the free piston generator. A combusted working medium is first subjected to first-stage expansion in the high-pressure cylinders and is then subjected to second-stage expansion in the low-pressure cylinders, which effectively increases the utilization rate of energy in exhaust gas, increases the expansion work, and further improves the thermal efficiency and the power generation efficiency of the free piston generator.

8 Claims, 2 Drawing Sheets

FREE PISTON GENERATOR BASED ON SPLIT THERMODYNAMIC CYCLE

TECHNICAL FIELD

The present disclosure relates to a free piston generator based on a split thermodynamic cycle, and belongs to the technical field of power energy.

BACKGROUND

With the continuous development of society, people's demand for energy is increasing, and the energy problem has become the main problem restricting further development of all walks of life. In various forms of energy, electrical energy is one of the most widely used energy sources, and electrical energy is mainly provided by diesel engines in industries such as vehicles and ships. In a traditional power generation process of the diesel engine, the form of energy transfer is that: first, the chemical energy of a fuel is converted into the mechanical energy output by a crankshaft through combustion of the diesel engine, and then this part of mechanical energy drives a motor to generate power and convert the power into electrical energy. The entire energy conversion process has gone through a lot of steps. At the same time, a lot of energy is lost due to a complex mechanical structure of the diesel engine, so the overall power generation efficiency is low. As for the free piston generator, the work characteristics of the free piston internal combustion engine and a linear motor are coupled, so that the chemical energy of the fuel can be directly converted into the electrical energy. Compared with the traditional power generation process of an internal combustion engine, this process has higher power generation efficiency and economic performance, so that it attracts more and more attentions.

For the ordinary free piston generator, a crank connecting rod structure is omitted, so that the mechanical friction between a piston and the cylinder liner is reduced, and the mechanical efficiency is improved. Since the structure in the cylinder is not changed too much compared to that of the ordinary internal combustion engine, and the work cycle in the cylinder is the same as that of the ordinary internal combustion engine, the thermal efficiency of the overall combustion is not improved. Since the thermal efficiency is restricted by the traditional work cycle of the engine, the further optimization of the power generation efficiency of the free piston generator is restricted.

SUMMARY

In order to solve the problems of low power generation efficiency of an existing free piston generator, the present disclosure provides a free piston generator based on a split thermodynamic cycle.

In order to solve the above-mentioned technical problems, the technical solutions adopted in the present disclosure are as follows.

The free piston generator based on a split thermodynamic cycle includes a linear generator set and two internal combustion engine sets arranged at two ends of the linear generator set. The linear generator set includes a shell, a rotor mandrel movably arranged on the shell in a penetrating manner, a stator coil fixedly arranged in the shell and coaxially sleeving the outside of the rotor mandrel, and a generator rotor coaxially fixedly arranged on the rotor mandrel and located between the stator coil and the rotor mandrel;

each internal combustion engine set includes a high-pressure cylinder and a low-pressure cylinder; the high-pressure cylinder includes a high-pressure cylinder block and a high-pressure piston; a closed end of the high-pressure cylinder block is provided with a fuel injector, a high-pressure inlet valve, and a high-pressure exhaust valve; the low-pressure cylinder includes a low-pressure cylinder block and a low-pressure piston; a closed end of the low-pressure cylinder block is provided with a low-pressure inlet valve, a low-pressure exhaust valve, an exhaust gas inlet, and an air outlet valve; an intercooler is connected and arranged between the air outlet valve and the high-pressure inlet valve; an exhaust gas communicating pipe is connected and arranged between the high-pressure exhaust valve and the exhaust gas inlet; and the high-pressure piston is fixedly connected to an end part of the rotor mandrel, and the two low-pressure pistons are connected through a connection assembly.

Further, the connection assembly includes a crankshaft and two sets of crank connecting rod mechanisms; the two low-pressure pistons are connected to connecting rods in the two sets of crank connecting rod mechanisms in one-to-one correspondence; and cranks in the two sets of crank connecting rod mechanisms are simultaneously connected to the crankshaft.

Further, springs are fixedly arranged between two ends of the generator rotor and the shell, respectively.

Further, the number of the high-pressure inlet valves mounted on each high-pressure cylinder block is two.

Further, the stroke of the low-pressure cylinder is the same as that of the high-pressure cylinder.

Further, the volume and the inner diameter of the high-pressure cylinder block are less than the volume and the inner diameter of the low-pressure cylinder block.

Further, piston rings are mounted on the high-pressure piston and the low-pressure piston.

Further, the high-pressure cylinder block and the low-pressure cylinder block are provided with cylinder heads, and a temperature sensor and a pressure sensor are arranged on each cylinder head.

Compared with the existing art, the present disclosure has the following effects.

Air is first subjected to first-stage compression by the low-pressure cylinder set in an internal combustion engine set and is then subjected to second-stage compression in the high-pressure cylinders, so that the intake pressure of an internal combustion engine is effectively increased, which is favorable for increasing the average effective pressure in a work process, thereby improving the thermal efficiency and the power generation efficiency of the free piston generator.

A combusted working medium is first subjected to first-stage expansion in the high-pressure cylinders and is then subjected to second-stage expansion in the low-pressure cylinders, which effectively increases the utilization rate of energy in exhaust gas, increases the expansion work, and further improves the thermal efficiency and the power generation efficiency of the free piston generator.

DETAILED DESCRIPTION

Figure 1:
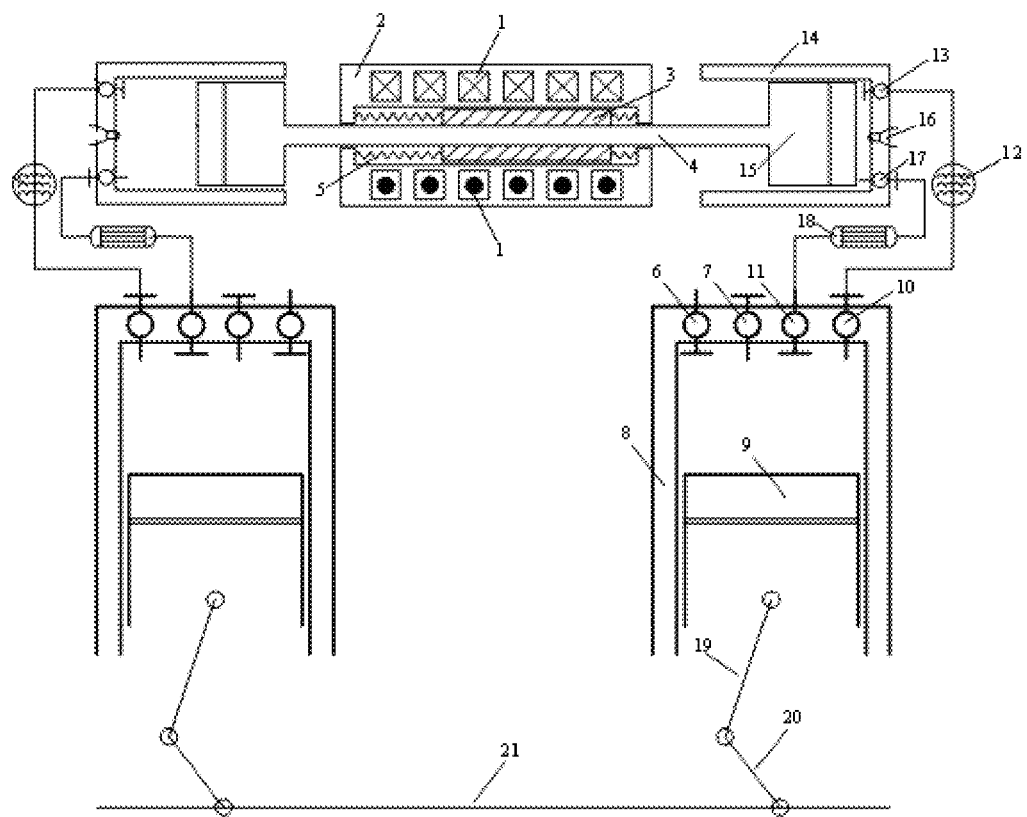
FIG. 1 is a schematic diagram of a front view of the present disclosure.
Figure 2:
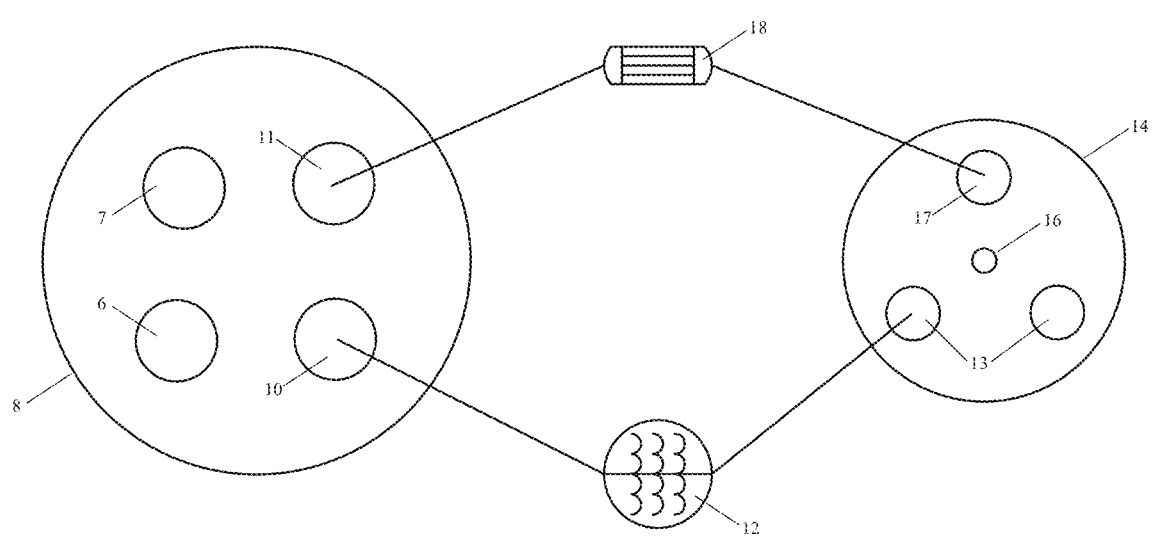
FIG. 2 is a schematic diagram of connection between a high-pressure cylinder and a low-pressure cylinder in an internal combustion engine set.

Specific implementation I: This implementation is described in combination with FIG. 1 and FIG. 2. A free piston generator based on a split thermodynamic cycle includes a linear generator set and two internal combustion engine sets arranged at two ends of the linear generator set. The linear generator set includes a shell 2, a rotor mandrel 4 movably arranged on the shell 2 in a penetrating manner, a stator coil 1 fixedly arranged in the shell 2 and coaxially sleeving the outside of the rotor mandrel 4, and a generator rotor 3 coaxially fixedly arranged on the rotor mandrel 4 and located between the stator coil 1 and the rotor mandrel 4;

each internal combustion engine set includes a high-pressure cylinder and a low-pressure cylinder; the high-pressure cylinder includes a high-pressure cylinder block 14 and a high-pressure piston 15; a closed end of the high-pressure cylinder block 14 is provided with a fuel injector 16, a high-pressure inlet valve 13, and a high-pressure exhaust valve 17; the low-pressure cylinder includes a low-pressure cylinder block 8 and a low-pressure piston 9; a closed end of the low-pressure cylinder block 8 is provided with a low-pressure inlet valve 6, a low-pressure exhaust valve 7, an exhaust gas inlet 11, and an air outlet valve 10; an intercooler 12 is connected and arranged between the air outlet valve 10 and the high-pressure inlet valve 13; an exhaust gas communicating pipe 18 is connected and arranged between the high-pressure exhaust valve 17 and the exhaust gas inlet 11; and the high-pressure piston 15 is fixedly connected to an end part of the rotor mandrel 4, and the two low-pressure pistons 9 are connected through a connection assembly.

Working Principle:

The internal combustion engine set drives the rotor mandrel 4 to move, and the generator rotor 3 cuts magnetic induction lines generated by the stator coil 1 to generate power.

Air enters the low-pressure cylinder block 8 from the low-pressure inlet valve 6 and is subjected to first-stage compression under the action of the low-pressure piston 9, and compressed air enters the intercooler 12 for cooling from the air outlet valve 10.

The compressed air in the intercooler 12 enters the high-pressure cylinder block 14 through the high-pressure inlet valve 13 and is subjected to second-stage compression under the action of the high-pressure piston 15.

After the compression process is completed, the fuel injector 16 injects fuel, so combustion occurs in the high-pressure cylinder block 14; combustion gas pushes the high-pressure piston 15 for first-stage expansion; the expanded combustion gas flows out through the high-pressure exhaust valve 17 to the exhaust gas communicating pipe 18 and flows through the exhaust gas inlet 11 into the low-pressure cylinder block 8 to push the low-pressure piston 9 for second-stage expansion; and finally, the combustion gas completing the expansion is discharged to an external environment through the low-pressure exhaust valve 7.

The high-pressure cylinder adopts a compression ignition method which enables mixed gas to be self-ignited after fuel injection.

Air is first subjected to first-stage compression by the low-pressure cylinder set in an internal combustion engine set and is then subjected to second-stage compression in the high-pressure cylinders, so that the intake pressure of an internal combustion engine is effectively increased, which is favorable for increasing the average effective pressure in a work process, thereby improving the thermal efficiency and the power generation efficiency of the free piston generator.

A combusted working medium is first subjected to first-stage expansion in the high-pressure cylinders and is then subjected to second-stage expansion in the low-pressure cylinders, which effectively increases the utilization rate of energy in exhaust gas, increases the expansion work, and further improves the thermal efficiency and the power generation efficiency of the free piston generator.

The connection assembly includes a crankshaft 21 and two sets of crank connecting rod mechanisms; the two low-pressure pistons 9 are connected to connecting rods 19 in the two sets of crank connecting rod mechanisms in one-to-one correspondence; and cranks 20 in the two sets of crank connecting rod mechanisms are simultaneously connected to the crankshaft 21. In such a design, it is conductive to controlling phase timing of two sets of cylinders to ensure the stability of operation of a linear motor. The low-pressure cylinder has a working stroke and a non-working stroke. In the working stroke, work is output to the outside to drive the crankshaft to rotate; and in the non-working stroke, output work of the other cylinder is required.

Since two high-pressure cylinders are connected to the same rotor mandrel for transverse movement to drive a motor to generate power, in order to ensure the work stability of the motor, it is required to ensure that the work phases of the two high-pressure cylinders are just staggered, and the rotor mandrel can move left and right in accordance with this phase difference. The two low-pressure pistons are connected to the same crankshaft, which can ensure that their work phases can be just staggered and kept constant, so as to eventually synchronize the movements of the above rotor mandrels.

Springs 5 are fixedly arranged between two ends of the generator rotor 3 and the shell 2, respectively. In such a design, the movement of the generator rotor 3 is limited through the springs 5. Since the rotor mandrel is fixedly connected to the piston, the movement of the piston can also be limited.

The number of the high-pressure inlet valves 13 mounted on each high-pressure cylinder block 14 is two. In such a design, the volume efficiency of the high-pressure cylinder block 14 is improved.

The stroke of the low-pressure cylinder is the same as that of the high-pressure cylinder.

The volume and the inner diameter of the high-pressure cylinder block 14 are less than the volume and the inner diameter of the low-pressure cylinder block 8. The generator of the present application is in a high-temperature environment; the volume and surface area of the high-pressure cylinder for combustion are relatively small, so that the heat transfer loss of the work process can be reduced, and the utilization rate of energy is increased.

Piston rings are mounted on the high-pressure piston 15 and the low-pressure piston 9. In such a design, a lubrication effect in the cylinder is enhanced, and leakage of air and combustion gas is prevented.

The high-pressure cylinder block 14 and the low-pressure cylinder block 8 are provided with cylinder heads, and a temperature sensor and a pressure sensor are arranged on each cylinder head. In such a design, a working state in the cylinder block is effectively monitored.

What is claimed is:

1. A free piston generator, comprising a linear generator set and two internal combustion engine sets arranged at two ends of the linear generator set, wherein the linear generator set comprises a shell, a rotor mandrel movably arranged on the shell in a penetrating manner, a stator coil fixedly arranged in the shell and coaxially sleeving the outside of the rotor mandrel, and a generator rotor coaxially fixedly arranged on the rotor mandrel and located between the stator coil and the rotor mandrel;

wherein each of the internal combustion engine sets comprises a high-pressure cylinder and a low-pressure cylinder; the high-pressure cylinder comprises a high-pressure cylinder block and a high-pressure piston; a closed end of the high-pressure cylinder block is provided with a fuel injector, a high-pressure inlet valve, and a high-pressure exhaust valve; the low-pressure cylinder comprises a low-pressure cylinder block and a low-pressure piston; a closed end of the low-pressure cylinder block is provided with a low-pressure inlet valve, a low-pressure exhaust valve, an exhaust gas inlet, and an air outlet valve; an intercooler is connected and arranged between the air outlet valve and the high-pressure inlet valve; an exhaust gas communicating pipe is connected and arranged between the high-pressure exhaust valve and the exhaust gas inlet; and the high-pressure piston is fixedly connected to an end part of the rotor mandrel;

wherein the respective low-pressure pistons of the two internal combustion engine sets are connected through a connection assembly.

2. The free piston generator according to claim 1, wherein the connection assembly comprises a crankshaft and two sets of crank connecting rod mechanisms; the two low-pressure pistons are connected to connecting rods in the two sets of crank connecting rod mechanisms in one-to-one correspondence; and cranks in the two sets of crank connecting rod mechanisms are simultaneously connected to the crankshaft.

3. The free piston generator according to claim 1, wherein springs are fixedly arranged between two ends of the generator rotor and the shell, respectively.

4. The free piston generator according to claim 1, wherein the number of the high-pressure inlet valves mounted on each high-pressure cylinder block is two.

5. The free piston generator according to claim 1, wherein the stroke of the low-pressure cylinder is the same as that of the high-pressure cylinder.

6. The free piston generator according to claim 5, wherein the volume and the inner diameter of the high-pressure cylinder block are less than the volume and the inner diameter of the low-pressure cylinder block.

7. The free piston generator according to claim 1, wherein piston rings are mounted on the high-pressure piston and the low-pressure piston.

8. The free piston generator according to claim 1, wherein the high-pressure cylinder block and the low-pressure cylinder block are provided with cylinder heads, and a temperature sensor and a pressure sensor are arranged on each cylinder head.

* * * * *